Oct. 31, 1967 J. ISREELI 3,350,220
TISSUE PROCESSING FOR ELECTRON MICROSCOPE EXAMINATION THEREOF
Filed July 12, 1963
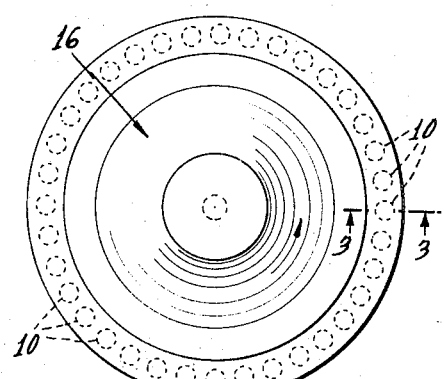
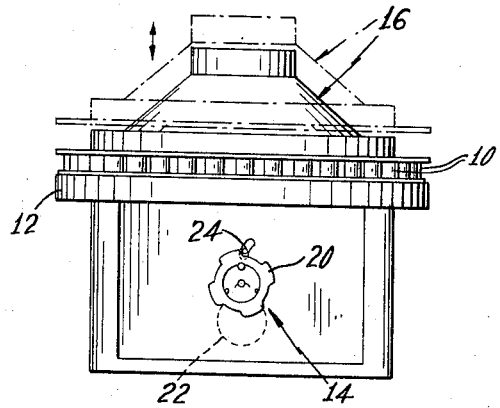
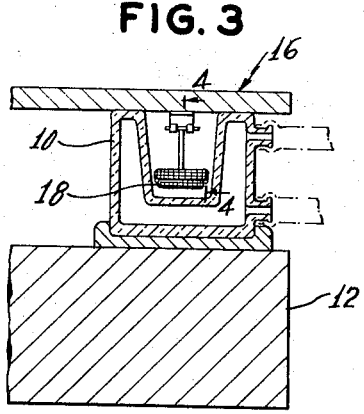
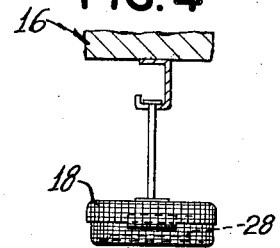
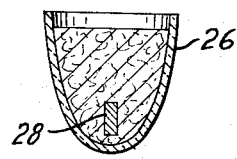
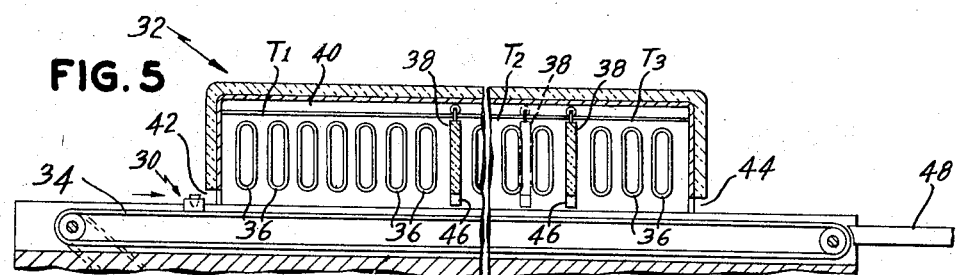
INVENTOR.
JACK ISREELI
BY
ATTORNEY

United States Patent Office 3,350,220
Patented Oct. 31, 1967

3,350,220
TISSUE PROCESSING FOR ELECTRON MICROSCOPE EXAMINATION THEREOF
Jack Isreeli, Tuckahoe, N.Y., assignor to The Technicon Company, Inc., Chauncey, N.Y., a corporation of New York
Filed July 12, 1963, Ser. No. 294,707
2 Claims. (Cl. 117—113)

This invention relates to a method of and means for preparing histologic tissue for examination by electron microscopy.

In the art of histology involving the use of an electron microscope for examining tissue, it is considered important that the preparation of the tissue for such examination be initiated immediately after the specimen is obtained; for example as soon as practicably possible upon removal of a growth or a part thereof from the anatomy.

The preparation or processing of the tissue involves the immersion of the specimen in various liquid reagents for certain periods of time which are different with various of the reagents, and it is desirable that the processing involving the series of immersions of the tissue be performed automatically. Automatic immersion apparatus or "tissue processors," as they are frequently called, have long been available for preparing tissue for examination under the usual optical (non-electron) microscope and are sold under the trademark "Autotechnicon" or "Technicon." Such apparatus is shown, for example, by United States Patents Nos. 2,341,198, 2,872,894 and 2,960,962 and other patents owned by the assignee of the present application. However, it is customary when using such apparatus to assemble a plurality of the tissue specimens and to initiate the processing of all of said specimens at the same time. This practice is not permissible for the examination of tissue by electron microscopy because, as pointed out above, the preparation of each specimen for such examination should begin without delay and therefore cannot be held up until other specimens are available for processing.

The primary object of the present invention is the provision of a method of and apparatus for preparing tissue specimens for electron microscopy examination, said method and apparatus being such that the processing of each tissue specimen can be initiated without delay and with the use of an automatic immersion apparatus which can handle several tissue specimens even though the preparation of the different specimens are initiated at different times.

Another object is the provision of a method and apparatus to facilitate embedding the tissue to provide a solid block which contains the tissue and which can be cut into ultra thin films or flakes by presently known techniques for examination of the tissue by electron microscopy.

The above and ancillary objects of the invention will be more fully understood from the following description considered in connection with the accompanying illustrative drawings.

In the drawings:

FIG. 1 is a side view of a tissue processor for practising the present invention;

FIG. 2 is a top plan view thereof;

FIG. 3 is a view, on a larger scale, on the line 3—3 of FIG. 2;

FIG. 4 is a view on a larger scale on the line 4—4 of FIG. 3;

FIG. 5 is a longitudinal sectional view of heating apparatus of the present invention for use in the embedding of the tissue;

FIG. 6 is a container for the embedding substance showing the tissue therein; and FIG. 7 shows a rack for one or more of the receptacles shown by FIG. 6.

In tissue examination by electron microscopy, the specimens are small pieces of tissue. Accordingly, the tissue holders and the reagent containers or "beakers" can be small, for example, beakers having a depth of 1½ inches and a diameter of 1 inch. As shown by FIGS. 1 and 2, a plurality of these beakers indicated at 10 are positioned laterally of each other on the support 12 of the automatic immersion apparatus or tissue processor which, except for the timer 14, can be of any desired type for automatically transferring the tissue from one container or beaker to the next beaker of a series of beakers after a predetermined immersion of the tissue in the liquid in the beaker. Beakers 10 may be jacketed as shown in FIG. 3 for the circulation of a heating or cooling fluid, if required. As here shown, the tissue processor comprises a conveyor 16 which is moved vertically upwardly for raising the perforated tissue basket 18 upwardly out of the beaker and which is then turned to position basket 18 over the next beaker followed by downward movement of the conveyor to position the basket in the next beaker for the next immersion. The mechanism for operating the conveyor at predetermined times is preferably the same as that shown in the above mentioned United States Patent No. 2,872,894 but its intermittent operation is controlled by timer 14 which is a repeat cycle timer comprising a rotary cam 20 actuated by an electric clock motor 22 for opening and closing a switch 24 in the circuit of the conveyor motor (not shown). Cam 20 is preferably removable and replaceable by another similar cam to provide difficult immersion times if required.

In accordance with the present invention, all of the periods of immersion of a tissue specimen in the liquids of the series of beakers are the same, say fifteen minutes, as hereinafter explained more fully, so that one or more tissue specimens can be introduced into the processor at the initial station with very little, if any, delay. For example, if the total required time of immersion in a particular liquid is one hour, four beakers containing said liquid will be positioned on support 12, one beaker at one of four successive stations and the period of immersion in each beaker will be fifteen minutes. The following is a non-limitative example of one operating cycle of the processor;

| Order of Immersion | Reagent | Immersion Time (minutes) | Number of Stations |
|---|---|---|---|
| 1 | Osmic acid (fixative) | [1] 1–2 | 4–8 |
| 2 | 35% alcohol (dehydrant) | 15 | 1 |
| 3 | 50% alcohol (dehydrant) | 15 | 1 |
| 4 | 70% alcohol (dehydrant) | 15 | 1 |
| 5 | 95% alcohol (dehydrant) | 45 | 3 |
| 6 | Absolute alcohol (dehydrant) | 30 | 2 |
| 7 | Propylene oxide (clearing agent) | 30 | 2 |
| 8 | Propylene oxide and Epon resin (equal parts by volume). | [1] 1–2 | 4–8 |

[1] Hours.

It will be understood that as indicated in the above table, the immersions in alcohol are for the purpose of dehydrating the tissue after it is fixed by the immersion in osmic acid, which is the first immersion operation on the processor; and that the strength of the alcohol is gradually increased in order to protect the tissue against impairment which might occur if the tissue were immersed in strong alcohol immediately after immersion in the fixative. The immersion in propylene oxide, which as indicated, is a clearing agent, is followed by the immersion in the solution of epon resin in propylene for facilitating the penetration of liquid epon resin into the tissue for the embedding operation to form a solid block so that the tissue can be cut into very thin sections.

At the end of the last immersion period, the tissue specimen is removed from the basket 18 and from its individual container in said basket and immediately placed in a small thimble-like receptacle 26 (FIG. 6) having a tapered bottom and containing liquid epon resin, said tissue specimen being indicated at 28. A rack 30 is provided for holding one or more receptacles in upright position. It will be understood that one end of embedded tissue will lie at one face of the block of epon, after the latter is solidified by the curing operation so that the tissue will be advantageously positioned in the block for optimum cutting of the tissue into thin sections or flakes for examination in the electron microscope.

The curing of the epon in receptacle 30 is initiated as soon as immersion of the tissue at the last immersion station is completed. The curing is performed preferably in a plurality of successive time periods of about 24 hours each, first at a temperature of 35° C., next at a temperature 45° C., and finally at a temperature of 60° C., when three such time periods are used. For this purpose the oven 32 (FIG. 5) is preferably employed. Said oven comprises three temperature regions or zones indicated at T1, T2, and T3 and is in the form of a longitudinally extending tunnel through which an endless conveyor is movable for moving rack 30 through said zones. Adjustable electric heating elements indicated at 36 are mounted on the opposite side walls of the tunnel for providing the desired temperatures in the heating zones. Said zones are separated from each other by transverse walls 38 which are movably suspended from ceiling track 40 so that they can be moved longitudinally of the tunnel to adjust the sizes of the heating zones. The speed of conveyor 34 is preferably adjustable by changing the speed of the conveyor drive motor (not shown). The tunnel has openings 42 and 44 at its opposite ends for the movement of racks 30 into and out of the oven, and transverse walls 38 have an opening 46 at the lower ends thereof to allow the passage of racks 30 through the zones. A stationary table indicated at 48 is positioned at the delivery end of conveyor 34 to receive racks 30 therefrom.

While I have shown and described the preferred embodiment of the invention, it will be understood that the invention may be embodied otherwise than as herein specifically illustrated or described and that certain changes in the form and arrangement of parts and in the specific manner of practicing the invention may be made without departing from the underlying idea or principles of this invention within the scope of the appended claims.

What is claimed is:

1. In a method of preparing tissue for microscopic examination wherein a tissue specimen is sequentially immersed by automatic immersion apparatus in each of several different liquids for respective predetermined lengths of time, the improvement comprising sequentially immersing said tissue specimen in such liquid as is contained in a plurality of containers with each immersion in each container being for an invariable identical interval of time; and for a plurality of said several different liquids, respectively disposing the same liquid in a number of containers arranged in a respective group one after the other in immediate succession, whereby the number of containers in such group of containers multiplied by said invariable identical interval of time will equal the respective predetermined length of time required for the immersion of the tissue specimen in the particular one of said several different liquids which is respectively disposed in such group of containers.

2. In a method according to claim 1 wherein said method includes providing one of said several different liquids in only one container.

References Cited

UNITED STATES PATENTS

| 2,218,935 | 10/1940 | Ingersoll | 264—66 |
| 2,386,079 | 10/1945 | Weiskopf | 118—425 |
| 2,393,580 | 1/1946 | Weiskopf | 117—3 |
| 2,615,421 | 10/1952 | Davis et al. | 118—7 |
| 2,625,730 | 1/1953 | Cremer | 264—57 |
| 2,872,894 | 2/1959 | Isreeli | 118—11 |
| 2,960,962 | 11/1960 | Pelavin | 118—11 |

OTHER REFERENCES

"Lucite" Acrylic Resin, Embedment of Specimen, In Du Pont Information Bulletin, No. X–28C, pp. 9, Aug. 1, 1955, 264–271 (pp. 4–7 relied on).

ALFRED L. LEAVITT, *Primary Examiner.*

E. B. LIPSCOMB, *Assistant Examiner.*